Jan. 31, 1956 L. G. SAYWELL 2,733,081
SEAL
Filed Feb. 1, 1952
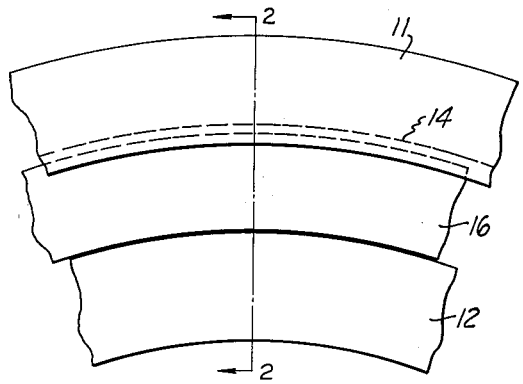
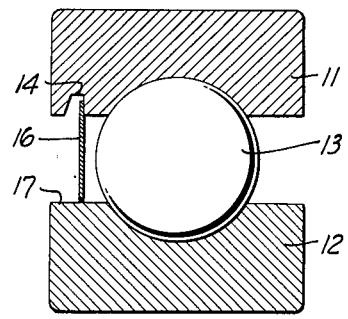
FIG_1_
FIG_3_
FIG_2_
FIG_4_
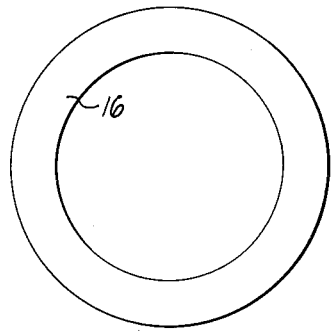
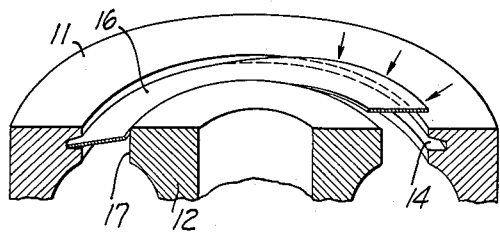
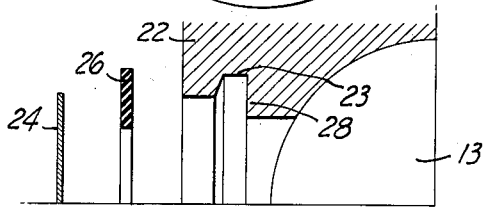
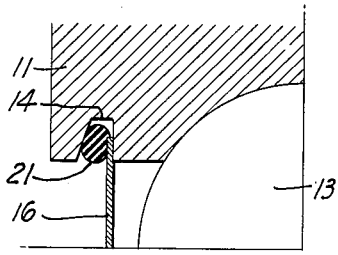
FIG_7_
FIG_8_
FIG_5_
FIG_6_
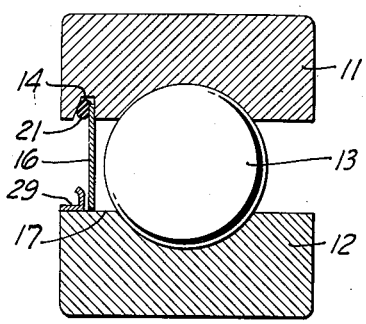
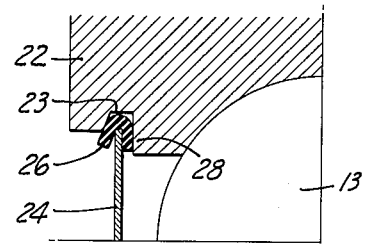
INVENTOR.
Lawrence G. Saywell
BY
ATTORNEYS

United States Patent Office 2,733,081
Patented Jan. 31, 1956

2,733,081
SEAL

Lawrence G. Saywell, San Mateo, Calif., assignor to Saywell Associates, a joint venture Application February 1, 1952, Serial No. 269,530

1 Claim. (Cl. 286—5)

This invention relates generally to ball or roller bearing assemblies such as are provided with built-in lubricant seals.

In the past it has been common to provide ball or roller bearing assemblies with lubricant seals built in at the factory, which serve to prevent loss of lubricant, and to protect the bearing against entrance of dust. One of the more common types of such sealing assemblies makes use of a felt sealing washer which is carried by one end of the outer race, and which extends into sealing contact with the outer periphery of the inner race. Seals of this type are subject to many limitations and difficulties. They are not capable of withstanding relatively high speed rotation, and even for moderate speeds, their useful life is not long. Cost of manufacture is considerable compared to the present invention and it is troublesome and difficult to replace the seal after it has become worn or damaged.

It is an object of the present invention to provide a lubricant seal for a ball or roller bearing assembly which is characterized by utmost simplicity, and which will have a long, useful life.

Another object of the invention is to provide a seal of the above character which is adapted for relatively high rotative speeds.

A further object of the invention is to provide a seal of the above character which imposes a minimum amount of torque upon operation of the bearing.

Additional objects of the invention will appear from the following description in which the preferred embodiments have been set forth in detail in conjunction with the accompanying drawing.

Referring to the drawing:

Figure 1 is a fragmentary side elevational view illustrating a complete ball bearing assembly incorporating the present invention.

Figure 2 is a cross section of detail taken along the line 2—2 of Figure 1.

Figure 3 is a side elevational view showing a spring annulus such as is used in connection with the present invention.

Figure 4 is a perspective view illustrating the manner in which the annulus of Figure 3 is installed in a ball bearing assembly.

Figures 5 and 6 are detail views like Figure 2 but showing modifications of the invention.

Figure 7 is an exploded view showing how the parts of Figure 6 are assembled.

Figure 8 is a detail like Figure 2 but showing another embodiment.

Referring first to Figures 1 and 2 of the drawing, I have shown a ball bearing assembly comprising the outer and inner ball bearing races 11 and 12, together with the the balls 13. As is well known such an assembly may include a suitable ball retaining cage. The outer race 11 adjacent one end thereof is shown provided with an annular groove 14, the side walls of which may be slightly divergent as illustrated. This groove may be similar in location and dimensioning to grooves now commonly used in connection with ball bearing assemblies for the mounting of lubricant seals of the felt washer type.

A substantially flat annulus 16 has its outer peripheral edge portion loosely accommodated within the groove 14. The inner periphery of the annulus 16 is dimensioned to be only slightly greater than the diameter of the cylindrical surface 17 which the annulus embraces.

The annulus 16 by itself is illustrated in Figure 3. It is preferably formed of relatively thin and readily bendable spring material, such as relatively thin spring metal which can be distorted to a substantial extent from normally substantial flat form without permanent deformation. For example, I can use suitable spring metals, such as high carbon steel, Phosphor bronze, and various stainless steels. The sheet metal used may, for example, range in thickness from 0.003 to 0.005 inch, and in typical instances good results have been secured by using high carbon steel sheet metal having a thickness of 0.003 inch. The outer diameter of the annulus 16 should be greater than the inner diameter of race 11, adjacent the groove 14, and preferably slightly less than the outer or rib diameter of the groove 14.

The manner in which the substantially flat annulus of Figure 3 is inserted in the ball bearing assembly is illustrated in Figure 4. The outer edge portion of the annulus, extending over roughly one-half of the circumference, is first placed into the groove 14 in the manner illustrated in Figure 4. This will require some bending or distortion of the annulus. Then by manually applying force to the remaining circumference of the annulus, as indicated by the arrows in Figure 4, the ring is distorted with some dishing to enable snapping in the remaining edge of the annulus into the groove 14. After the outer edge of the annulus has been completely positioned in the groove 14, the annulus springs back to its initial substantially planar form.

The seal of Figure 2 serves to provide an effective lubricant seal, particularly where the more viscous lubricants are employed, such as various greases. When grease is applied to the space occupied by the balls 13, it tends to press the annulus 16 to the left as viewed in Figure 2 to bring its outer periphery into engagement with one wall of the groove 14. Thus the outer periphery of the annulus is sealed with respect to the race 11, and the inner edge, because of its close clearance with the cylindrical portion 17, also forms a relatively effective grease seal. Normally relative rotation takes place between the inner race 12 and the annulus 16, although if there should be any abnormal friction or binding between the annulus 16 and the cylindrical surface 17, then the annulus may turn relative to the outer race 11. Should there be any slight eccentricity between the races, such eccentricity is accommodated by corresponding eccentric motion of the annulus 16, which is permitted because of its loose accommodation within the groove 14.

An assembly as described above is capable of operating over long periods of time without excessive wear. It imposes a minimum amount of torque on the bearing assembly and is capable of operating at relatively high speeds of rotation.

If one should wish to replace the annulus 16 because of excessive wear, this can be readily done by inserting a suitable tool into the groove 14 to engage the outer edge of the annulus, after which the annulus can be distorted and withdrawn.

To cite a specific example of a seal such as described above, race 11 had an inner diameter of 2.108 inches, and race 12 had an outer diameter of 1.453 inches. The groove 14 was 0.050 inch deep, thus providing a root diameter of 2.218 inches. Annulus 16 was made out of high carbon steel, with a thickness of 0.003 inch, an outside diameter of 2.201 inches, and an inside diameter of 1.457 inches. Such an annulus could be readily snapped into the groove 14 in the manner described above, and served to form an effective grease seal.

As illustrated in Figures 1 to 4 inclusive, the bearing assembly is provided with a single sealing annulus 16. It will be apparent that where desired the bearing assembly can be provided with two such annuluses, one at each end of the assembly.

In the modification illustrated in Figure 5, a resilient seal ring 21 made of suitable material, such as resilient synthetic rubber, is positioned within the groove 14, in such a manner as to establish sealing relationship between the outer race 11, and the outer peripheral edge portion of the annulus 16. The seal ring 21 can be normally compressed to maintain the desired sealing relationship, and can be inserted after the metal annulus has been snapped into the groove 14. While the seal ring 21 serves to establish the sealing relationship between the annulus and the outer race, it permits limited eccentric movement of the annulus 16, to accommodate eccentricity between the races, as previously described.

Figures 6 and 7 illustrate another embodiment of the invention in which a different type of seal is used between the outer periphery of the spring metal annulus and the outer race. In this case the outer race 22 is provided with the groove 23, and the spring metal annulus 24 has its outer periphery embraced by the resilient member 26 formed of suitable material, such as resilient synthetic rubber. As shown in exploded Figure 7, member 26 can be formed from flat rubber stock, in the form of an annulus of proper diameter, and when the seal is assembled, it is imposed between the annulus 24 and the ball bearing race 22. Thus when the annulus is inserted into the groove 23, the member 26 is folded about the outer margin of the annulus, whereby it is ultimately positioned as illustrated in Figure 6. When such sealing arrangement is used, the outer diameter of the annulus 24 may be substantially equal to the diameter of the cylindrical surface 27, of the outer race. Also the outer race and the groove 23 can be formed to provide the shoulder face 28, for contacting the adjacent surface of the rubber member 26. The proportioning of the parts should be such that after final assembly, there is sufficient compression of the rubber member 26 to provide the desired seal. At the same time, some eccentric motion is permitted between the annulus and the outer race.

As shown in Figure 8, the assembly of Figure 5 can be provided with a flinger ring 29 which is pressed upon the inner race. This ring aids in preventing entrance of dust into the bearing.

It will be evident from the foregoing that I provided a seal of utmost simplicity, which can be incorporated with prevailing types of ball or roller bearing assemblies.

While the seal established is not completely fluid tight, it is sufficient for many industrial applications. Wear is reduced to a minimum, particularly because the spring metal annulus may move a small amount in a radial direction to accommodate for eccentricity of the races, or inaccuracies in manufacture. The seal imposes a minimum amount of torque, and therefore is desirable in instances where it is important to maintain torque losses at a minimum.

This application is a continuation in part of my co-pending application #63,579 filed December 4, 1948, now U. S. Patent 2,600,433, issued June 17, 1952.

I claim:

In combination with inner and outer relatively rotatable and concentric annular members, the outer member having its inner periphery interrupted by an inwardly faced annular groove adjacent one end of the same, the inner member having a cylindrical portion extending for a substantial distance on both sides of the general plane of the groove, a single flat continuous annulus of thin spring metal having its outer peripheral edge portion loosely accommodated within said groove, the radial depth of the groove being greater than the outer diameter of the annulus and the outer diameter of the annulus being greater than the inner diameter of the outer member between said one end and said groove, the inner diameter of the annulus being only slightly greater than the outer diameter of the cylindrical portion of the inner member, the annulus being distortable within its elastic limit from its normal substantially flat form to a form in which it may be inserted in said groove, the inner peripheral edge of the annulus having a close running fit about a region of the cylindrical portion that is intermediate the ends of the same, the outer peripheral edge of the annulus engaging one wall of said groove to provide a seal, said annulus being free for limited radial motion relative to the outer member to accommodate for slight eccentricity between said inner and outer members.

References Cited in the file of this patent

UNITED STATES PATENTS

| 1,337,597 | Gilbert | Apr. 20, 1920 |
| 1,888,361 | Robinson | Nov. 22, 1932 |
| 2,100,113 | Travis | Nov. 23, 1937 |
| 2,275,996 | Searles | Mar. 10, 1942 |
| 2,467,049 | Peterson | Apr. 12, 1949 |
| 2,566,448 | Heintz et al. | Sept. 4, 1951 |
| 2,600,433 | Saywell | June 17, 1952 |
| 2,659,617 | Cobb | Nov. 17, 1953 |

FOREIGN PATENTS

| 11,787 | Great Britain | of 1908 |
| 30,847 | Great Britain | of 1909 |
| 526,125 | Great Britain | Sept. 11, 1940 |